(12) United States Patent
Allan et al.

(10) Patent No.: US 7,529,686 B2
(45) Date of Patent: May 5, 2009

(54) SUPPLY PLANNING SYSTEM AND METHOD UTILIZING CONSTRAINED AND UNCONSTRAINED EXPLOSION AND IMPLOSION OF FLAGGED DEMAND STATEMENTS

(75) Inventors: Robert F. Allan, Raleigh, NC (US); Amanda Kotecki, Hillsborough, NC (US); Michael G. Pauliks, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 1330 days.

(21) Appl. No.: 10/271,475

(22) Filed: Oct. 16, 2002

(65) Prior Publication Data

US 2004/0078259 A1    Apr. 22, 2004

(51) Int. Cl.
*G06F 17/30* (2006.01)
(52) U.S. Cl. .................................................. 705/10
(58) Field of Classification Search .................. None
See application file for complete search history.

(56) References Cited

U.S. PATENT DOCUMENTS

| | | | |
|---|---|---|---|
| 5,446,890 A | 8/1995 | Renslo et al. | |
| 5,548,518 A | 8/1996 | Dietrich et al. | |
| 5,630,070 A | 5/1997 | Dietrich et al. | |
| 5,787,283 A * | 7/1998 | Chin et al. | 705/7 |
| 5,943,484 A * | 8/1999 | Milne et al. | 700/99 |
| 5,960,414 A | 9/1999 | Rand et al. | |
| 5,970,465 A * | 10/1999 | Dietrich et al. | 705/7 |
| 5,971,585 A * | 10/1999 | Dangat et al. | 700/100 |
| 5,983,194 A | 11/1999 | Hogge et al. | |
| 6,041,267 A | 3/2000 | Dangat et al. | |
| 6,044,354 A | 3/2000 | Asplen, Jr. | |
| 6,047,290 A | 4/2000 | Kennedy et al. | |
| 6,049,742 A * | 4/2000 | Milne et al. | 700/99 |
| 6,119,102 A | 9/2000 | Rush et al. | |
| 6,122,560 A * | 9/2000 | Tsukishima et al. | 700/106 |
| 6,138,103 A | 10/2000 | Cheng et al. | |
| 6,151,582 A | 11/2000 | Huang et al. | |
| 6,167,380 A | 12/2000 | Kennedy et al. | |
| 6,188,989 B1 | 2/2001 | Kennedy et al. | |
| 6,188,990 B1 | 2/2001 | Brook et al. | |
| 6,243,613 B1 | 6/2001 | Desiraju et al. | |
| 6,266,655 B1 | 7/2001 | Kalyan | |

(Continued)

FOREIGN PATENT DOCUMENTS

EP    0 323 383    11/1988

(Continued)

OTHER PUBLICATIONS

Jayaraman, Ranga, Dynamic Modeling for Re-Engineering Supply Chains IBM Research Report, RC19944, Feb. 21, 1995.*

(Continued)

*Primary Examiner*—Scott L. Jarrett
(74) *Attorney, Agent, or Firm*—Gibb I.P. Law Firm, LLC; Derek S. Jennings

(57) ABSTRACT

A method for determining chase quantities of components for products, where the products have a plurality of associated demand types. The method sets a flag on at least one of the demand types and executes the demand types. During the executing, component supply constraints on flagged demand types are ignored.

13 Claims, 3 Drawing Sheets

U.S. PATENT DOCUMENTS

| | | | |
|---|---|---|---|
| 6,272,389 | B1 | 8/2001 | Dietrich |
| 6,415,196 | B1 * | 7/2002 | Crampton et al. ............ 700/100 |
| 6,535,773 | B1 * | 3/2003 | Takata et al. .................. 700/99 |
| 6,584,370 | B2 * | 6/2003 | Denton et al. ................ 700/107 |
| 6,701,201 | B2 * | 3/2004 | Hegde et al. ................. 700/107 |
| 7,058,587 | B1 * | 6/2006 | Horne ............................ 705/7 |
| 7,289,968 | B2 * | 10/2007 | Ferreri et al. ................. 705/28 |
| 2001/0020230 | A1 | 9/2001 | Kaneko et al. |
| 2003/0046191 | A1 * | 3/2003 | Ferreri et al. ................. 705/28 |
| 2003/0229550 | A1 * | 12/2003 | DiPrima et al. ............... 705/28 |

FOREIGN PATENT DOCUMENTS

JP                 2000301437         10/2000

OTHER PUBLICATIONS

Leachman, Robert C. et al., IMPReSS: An Automated Production-Planning and Delivery Quotation System at Harris Corporation-Semiconductor Sector, Interfaces, Jan.-Feb. 1996, pp. 6-37.*

Ha, Albert Y., Inventory Rationing in a Make-to-Stock Production System with Several Demand Classes and Lost Sales Management Science, vol. 43, No. 8, Aug. 1997.*

Deshpande, Vinayak, Supply Chain Coordination with Service Differentiated Customer Classes University of Pennsylvania, 2000.*

IBM Watson Implosion Technology Release 6.0 User's Guide IBM, Mar. 2000.*

Cattani, Kyle D. et al., Inventory Rationing and Shipment Flexibility Alternatives For Direct Market Firms Production and Operations Management, vol. 11, No. 4, Winter 2002, pp. 441-457.*

Dietrich, Brenda, IBM Research Report: Applications of Implosion in Manufacturing Planning IBM, RC20389, Feb. 28, 1996.*

Spinivasan, Ramesh et al., Procurement of Common Components in a Stochastic Environment IBM T.J. Watson Research Center, 1998.*

Agrawal, Narendra et al., Optimal Material Control in an Assembly System with Component Commonality John Wiley & Sons, Inc., 2001.*

Product Resource Manager Web Pages IBM Research, Feb. 2000, Retrieved from Archive.org Aug. 2, 2007.*

Lyon, Peter et al., Matching Assets with Demand in Supply-Chain Management at IBM Microelectronics Interfaces, vol. 31, No. 1, Jan.-Feb. 2001, pp. 108-124.*

IBM, IBM Watson Implosion Technology, Release 6.0, User's Guide and Reference, Mar. 20, 2000, pp. 1-337.

* cited by examiner

SUPPLY PLANNING SYSTEM AND METHOD UTILIZING CONSTRAINED AND UNCONSTRAINED EXPLOSION AND IMPLOSION OF FLAGGED DEMAND STATEMENTS

BACKGROUND OF THE INVENTION

1. Field of the Invention

The present invention generally relates to the automation of supplying components for a product to be manufactured and more particularly to an improved system that utilizes Boolean flagged demand statements to properly allocate available components.

2. Description of the Related Art

In order to provide a sufficient volume of components needed to manufacture a given product, material requirements planning (MRP) programs are utilized. Such programs estimate the different volumes of the different components based upon sales forecasts and other information. However, the actual sales often deviate from the sales forecast which results in an excessive number of unneeded parts and a deficient number of needed parts.

When updating the forecast of needed components, managers often face the situation of being unable to supply finished products to customers who have agreed to purchase the products. This can occur because the actual sales exceeded the sales forecast or because the planning program did not estimate a sufficient number of components for the given product.

In addition, different products can have different priorities. For example, products which have already been sold and only need to be manufactured and delivered generally have a higher priority than the products that are being manufactured in the hope that they will be sold. Similarly, different customers can be given a different priority, depending upon their value to the company. It is important that a manufacturing organization allocate the limited supply of components to the products having the highest demand priority before such components are released to other lower-priority products.

Therefore, there is a need for a method and system that takes into account the limited availability of components, and allocates these components to the highest-priority products. In addition, such a system should provide information as to which components are in short supply, so that managers can increase inventory of such needed components. The invention described below provides such a system that is cost-efficient, properly allocates the components to the appropriate products, reduces the lead time for manufacturing, and reduces unnecessary component ordering.

SUMMARY OF THE INVENTION

In view of the foregoing and other problems, disadvantages, and drawbacks of the conventional material requirement systems the present invention has been devised, and it is an object of the present invention to provide a structure and method for an improved material requirement systems.

In order to attain the object(s) suggested above, there is provided, according to one aspect of the invention, a method for determining chase quantities of components for products, where the products have a plurality of associated demand types. The method sets a flag on at least one of the demand types and executes the demand types. During the executing, component supply constraints on flagged demand types are ignored.

The invention performs an implosion operation on the flagged demand types. Component supply constraints are ignored for the flagged demand types during the implosion. The invention also performs an explosion on the flagged demand types. The difference between the implosion and the explosion produces a risk indicator. The risk indicator provides information as to components that need to be chased. The invention performs an implosion on the non-flagged demand types; however, component supply constraints are considered for the non-flagged demand types.

The invention also includes a method of planning the supply of components needed to manufacture products. The method provides demand statements (wherein each of the demand statements indicates a quantity of a product desired), flags the demand statements, and determines a volume of the components needed based on an implosion of the demand statements. The implosion is performed without constraints for flagged demand statements.

The invention also provides a system for planning the supply of components needed to manufacture products. The system includes demand statements, wherein each of the demand statements indicate a quantity of a product desired, and flags associated with the demand statements. An implosion of the demand statements determines the volume of the components needed. The implosion is performed without constraints for flagged demand statements.

With the invention, all auto-commit flag demand statements will be processed through the implosion and explosion operations. This is different than the full implosion operation because the full implosion operation will eliminate final products that cannot be manufactured with existing component inventories. To the contrary, the hybrid implosion/explosion operation produces a risk indicator that shows which components need to be chased (and a priority order of chasing such components). Further, by auto-commit flagging the demand statements, the invention insures that the flagged demand statements will be fully completed. Thus, if a demand statement has a high enough importance to be auto-commit flagged, this indicates that, if sufficient quantities of components are not available, that they must be chased in order to complete the demand statements. To the contrary, the demand statements that are not auto-commit flagged fall into the full implosion operation and run the risk of being limited (reduced) according to the available component supply.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
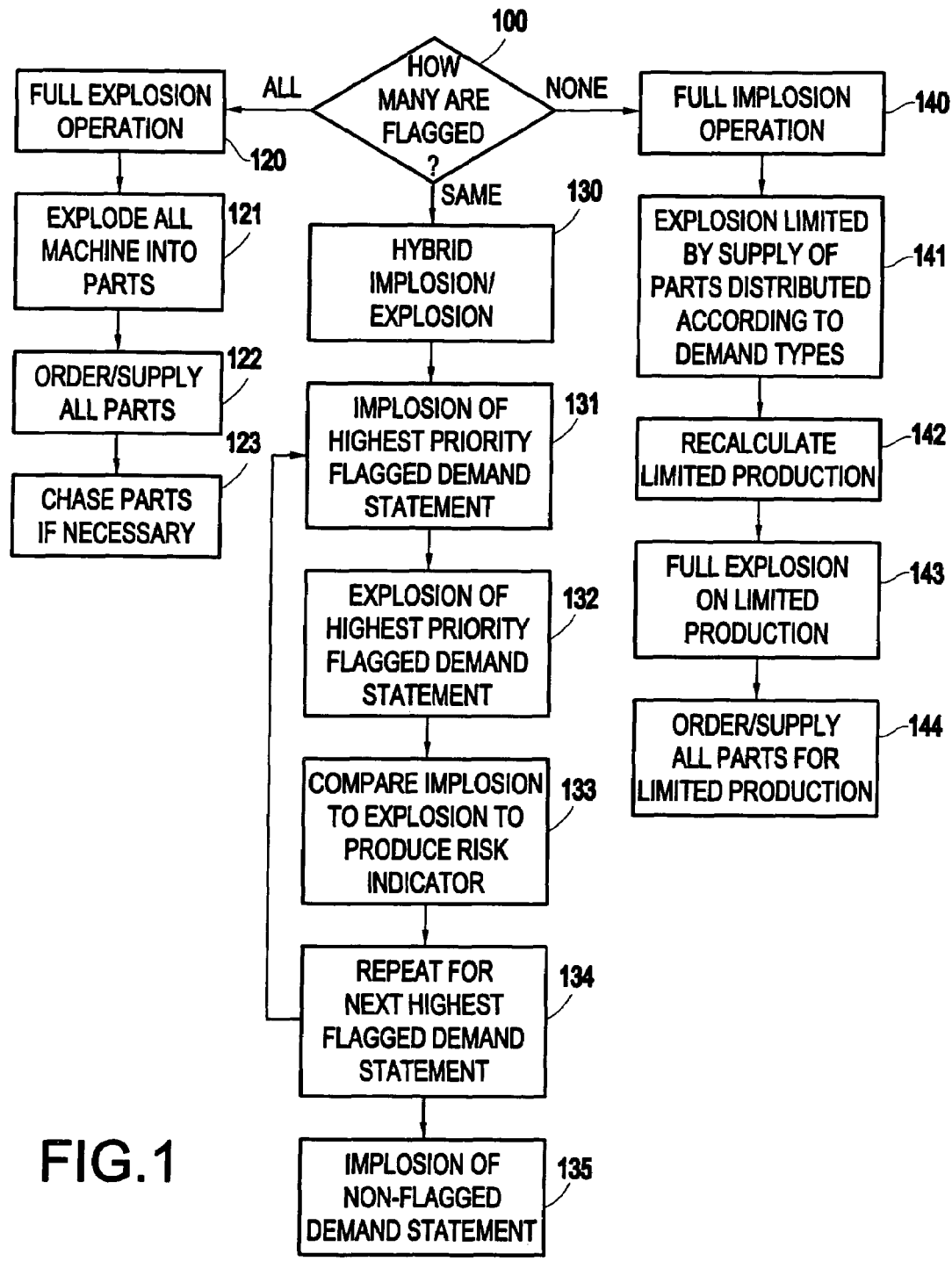
FIG. 1 is a flowchart illustrating a preferred embodiment of the invention.

As mentioned above, one problem that exists with conventional material requirements planning programs is their inability to properly relate the different priorities of products to the available components. The invention overcomes this deficiency by attaching a flag to the different demand statements for a given product. The demand statement can be considered to have a flag that is turned on or off. Alternatively, a flag can be considered to be associated with a given demand statement. At many points in this disclosure, this flag is referred to as the "auto-commit" flag. With the invention each demand statement is given its own priority through the use of the auto-commit flag. A demand statement may relate to a single order, a group of orders, or other similar types of information that indicate how much of a particular product is needed. Further, with the invention, each demand statement can have a different priority from the other demand statements.

When determining the number of components that are needed to manufacture a given product, an "explosion" operation is performed. Such a process is generally shown as items 120-123 in FIG. 1. More specifically, item 120 indicates the initiation of an explosion operation. In item 121, the invention explodes all machines (final products) into their constituent parts (components). In other words, the final product to be manufactured is broken down into its constituent parts. Then, the number of constituent parts is multiplied by the desired number of final products to determine the total number of components that are needed in order to manufacture the desired number of final products. The total number of parts required is then compared with available component inventory to determine whether additional parts need to be acquired (chased), in item 123. A component needs to be chased if it is unavailable (e.g., not in inventory and not expected to be in inventory within a necessary time period). For example, to "chase" a given component, a manager may put additional pressure on a supplier, may offer a higher price for a particular component, may look to different suppliers for that component, etc.

However, this explosion process ignores the supply of components that are available (or will become available in the near future). Therefore, the invention also uses another operation that is termed an "implosion" operation. Such an operation is illustrated in items 140-144 in FIG. 1. More specifically, item 140 indicates the initiation of the implosion operation. In item 141, an explosion operation is performed; however, this explosion operation is limited by the supply of components that are available. This limited supply is allocated to different final products depending upon the priority (demand type) of the final product.

Therefore, the explosion operation is performed in stages during an implosion. In the first stage, the highest priority demand type is fully exploded. If sufficient quantities of components remain, the next highest priority demand type is then exploded. Once the supply of a component is exhausted, the implosion process will continue for only those final products that do not use the exhausted components. In this way, the explosion operation is limited by the supply of available components in an implosion operation.

Once the limited explosion operation is completed, the number of final products that can be manufactured is adjusted to correspond to the quantity of components available, as shown in item 142. Then, in item 143, a full explosion operation is performed on this reduced (limited) production quantity of final products. In item 144, the available products are supplied so that the limited number of final products can be produced.

Being strictly limited to a full implosion operation or a full explosion operation has a number of drawbacks. For example, as mentioned above, some customers may have a higher value to the manufacturing organization than other customers. These different customers may order the same final product. Therefore, it is important to distinguish the demand statements for a highly-valued customer from the demand statements for a lower-valued customer. It is difficult or impossible to distinguish between such demand statements during a full implosion or full explosion operation.

In order to overcome these drawbacks, the invention presents a hybrid implosion/explosion process in items 130-135 (shown in FIG. 1). More specifically with the invention, a demand statement can be flagged with a certain priority auto-commit flag. For those demand statements that are flagged, the supply restrictions are temporarily ignored. Those demand statements that are not flagged the implosion analysis that considers the supply restrictions (constraints).

As shown in FIG. 1, the invention evaluates the demand statements to determine how many have the auto-commit flag (item 100). If all demand statements have the auto-commit flag, a full explosion operation is performed (items 120-123). If none of the demand statements have the auto-commit flag, a full implosion operation is performed (items 140-144). If only some of the demand statements include the auto-commit flag, the hybrid implosion/explosion operation is performed (items 130-135). The flags can be associated with the different demand statements in a number of ways. For example, each demand statement can be individually flagged. Alternatively, all demand statements which have a certain demand type can receive an auto-commit flag.

Item 130 indicates the initiation of the hybrid implosion/explosion operation. In item 131, an implosion of the demand statement having the highest priority auto commit flag is performed and, in item 132, an explosion operation is performed on the same demand statement. In item 133, the implosion operation is compared to the explosion operation. Any difference in component quantities between the explosion operation and the implosion operation is referred to as a risk indicator. The risk indicator provides the manager with information as to which components need to be chased.

This process is then repeated for the demand statement having the next highest priority auto-commit flag, as shown in item 134. After the auto-commit flagged demand statements are processed in items 131-134, and implosion operation (considering constraints) is performed on the remaining non-flagged demand statements.

Therefore, with the invention, all auto-commit flag demand statements will be processed through the implosion and explosion operations in items 131 and 132. This is different than the full implosion operation shown in items 140-144 because the full implosion operation will eliminate final products that cannot be manufactured with existing component inventories (in item 141). To the contrary, the hybrid implosion/explosion operation produces a risk indicator that shows which components need to be chased (and a priority order of chasing such components). Further, by auto-commit flagging the demand statements, the invention. insures that the flagged demand statements will be fully completed. Thus, if a demand statement has a high enough importance to be auto-commit flagged, this indicates that if sufficient quantities of components are not available that they must be chased in order to complete the demand statements. To the contrary, the demand statements that are not auto-commit flagged fall into the full implosion operation in item 135 and run the risk of being limited (reduced) according to the available component supply.

Figure 2:
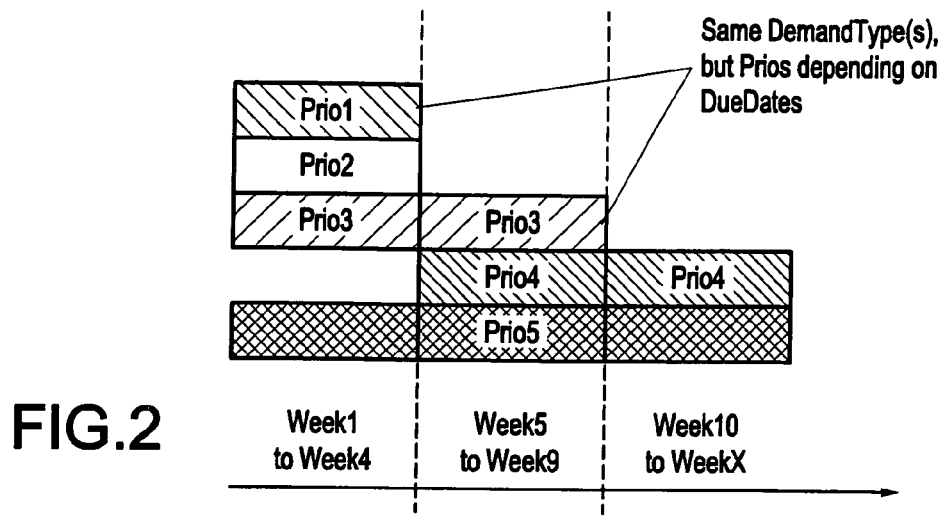
FIG. 2 is a supply planning chart that illustrates an advantage of the invention.
Figure 3:
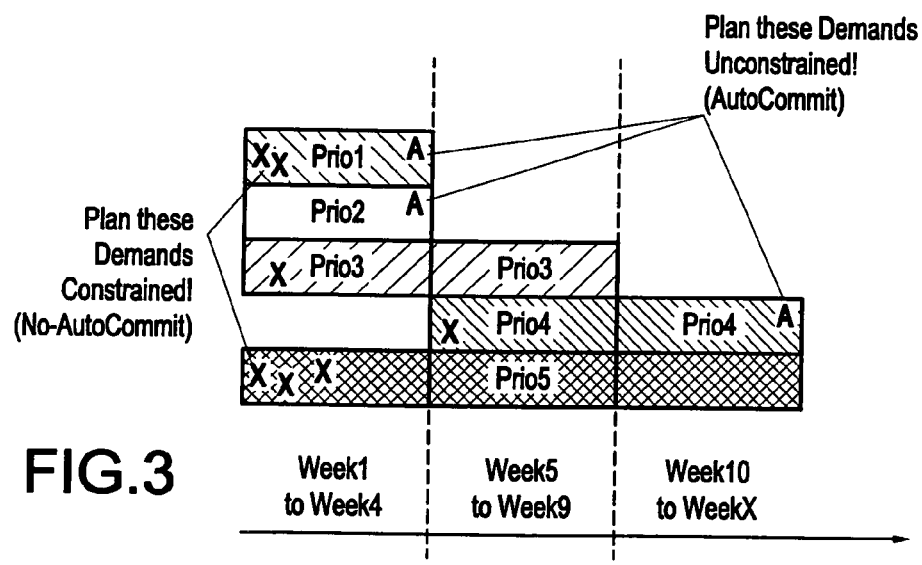
FIG. 3 is a supply planning chart that illustrates an advantage of the invention.
Figure 4:
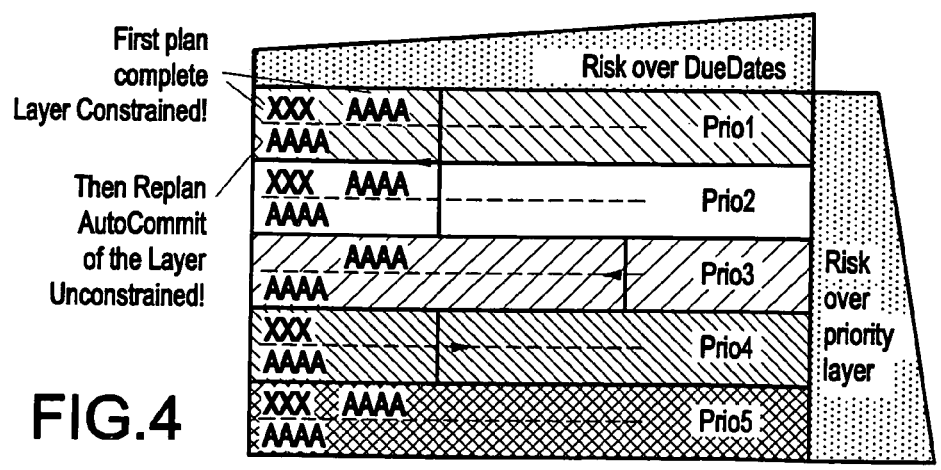
FIG. 4 is a supply planning chart that illustrates an advantage of the invention.

The benefits of the invention can also be seen through the examples shown in FIGS. 2-4. FIG. 2 illustrates a planning grid for various demand statements having different priorities (Prio 1-5). As shown in FIG. 2, the execution of the demand statements depends not only on demand type (priority) but also on due date. More specifically, Prio 3 in weeks 5-9 has the same demand type as Prio 1 in weeks 1-4; however, Prio 3 in the weeks 5-9 is given a lower overall priority because it has a later due date.

FIG. 3 illustrates a similar situation as that shown in FIG. 2; however FIG. 3 shows the auto-commit flags (A) and the demand statements that are not flagged (X). As explained above, the auto-commit flagged demand statements will be planned in an unconstrained matter (producing risk indicators if there is insufficient component supply) while, to the contrary, the demand statements (X) that are not flagged will be planned in a constrained manner (in item 135).

FIG. 4 is a supply planning chart showing the risk over the due dates verses the risk over the priority layer. FIG. 4 illustrates where the first plan was completed with the layer is constrained. Then FIG. 4 shows how the invention replans the autocommit of the layer in an unconstrained manner.

Figure 5:
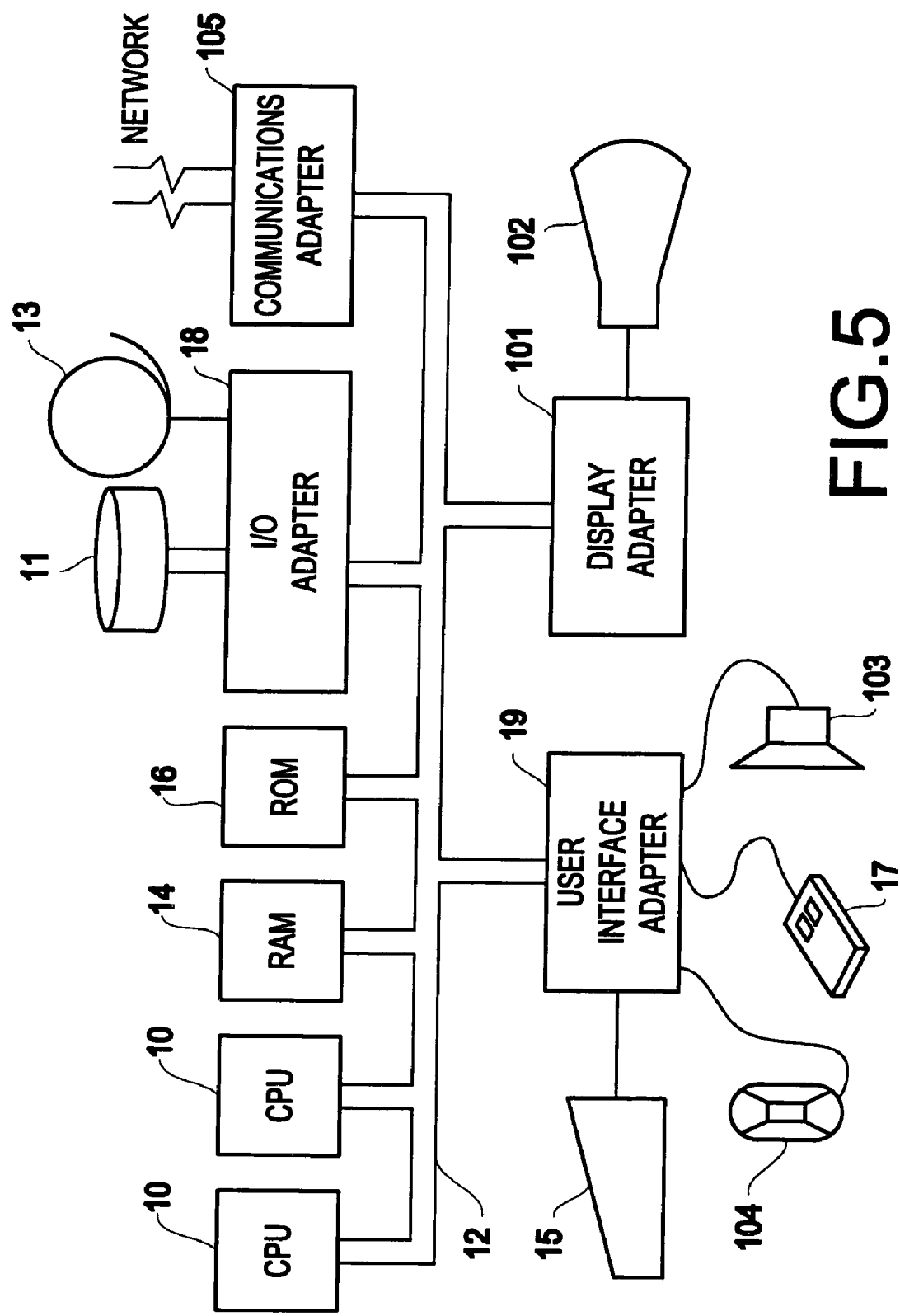
FIG. 5 is a hardware system that can be used with the invention.

A representative hardware environment for practicing the present invention is depicted in FIG. 5, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, and an input/output (I/O) adapter 18. The I/O adapter 18 connects peripheral devices, such as disk units 11 and tape drives 13, to the bus 12. A user interface adapter 19 connects keyboard 15, mouse 17, speaker 103, microphone 104, and/or other user interface devices such as a touch screen device (not shown) to the bus 12. The configuration also includes a communication adapter 105 for connecting the information handling system to a data processing network, and a display adapter 101 for connecting the bus 12 to display device 102. A program storage device readable by the disk or tape units, is used to load the instructions which operate on the invention which is loaded onto the computer system.

With the invention, all auto-commit flag demand statements will be processed through the implosion and explosion operations. This is different than the full implosion operation because the full implosion operation will eliminate final products that cannot be manufactured with existing component inventories. To the contrary, the hybrid implosion/explosion operation produces a risk indicator that shows which components need to be chased (and a priority order of chasing such components). Further, by auto-commit flagging the demand statements, the invention insures that the flagged demand statements will be fully completed. Thus, if a demand statement has a high enough importance to be auto-commit flagged, this indicates that, if sufficient quantities of components are not available, that they must be chased in order to complete the demand statements. To the contrary, the demand statements that are not auto-commit flagged fall into the full implosion operation and run the risk of being limited (reduced) according to the available component supply.

While the invention has been described in terms of preferred embodiments, those skilled in the art will recognize that the invention can be practiced with modification within the spirit and scope of the appended claims.

What is claimed is:

1. A method for determining chase quantities of at least one component for at least one product where products have a plurality of associated demand types, said method comprising:

providing demand statements, wherein each of said demand statements indicates a quantity of a product desired;

setting a flag on at least one of said demand types;

performing an implosion operation on a highest priority flagged demand type, wherein component supply constraints are ignored for said flagged demand types during said implosion;

performing an explosion operation on said highest priority flagged demand type;

determining, on a computer processor, a difference between said implosion and said explosion by comparing results of said implosion with results of said explosion, wherein said difference between said implosion and said explosion produces a risk indicator;

repeating said implosion operation, said explosion operation and said determining said difference on said next highest priority flagged demand type until there are no more unprocessed flagged demand types;

identifying components that need to be chased and a priority order of chasing said identified components when said risk indicator is greater than an available quantity; and showing said identified components that need to be chased and a priority order of chasing said identified components, wherein said implosion on said non-flagged demand types considers component supply constraints for said non-flagged demand types.

2. A method of planning the supply of components needed to manufacture products comprising:

providing demand statements, wherein each of said demand statements indicates a quantity of a product desired;

flagging ones of said demand statements to produce flagged demand statements;

determining, on a computer processor, a volume of said components needed based on an implosion of a highest priority flagged demand statement, wherein said implosion is performed without constraints for said flagged demand statements;

performing an explosion on said highest priority flagged demand statement;

determining a difference between said implosion and said explosion by comparing results of said implosion with results of said explosion, wherein said difference between said implosion and said explosion produces a risk indicator;

repeating said implosion operation, said explosion operation and said determining said difference on said next highest priority flagged demand statement until there are no more unprocessed flagged demand statements;

identifying components that need to be chased and a priority order of chasing said identified components when said risk indicator is greater than an available quantity; and showing said identified components that need to be chased and a priority order of chasing said identified components, wherein said implosion is performed with constraints for non-flagged demand statements.

3. The method according to claim 2, wherein said determining process produces risk indicators for said flagged demand statements, wherein said risk indicators provide a quantity of needed components that are unavailable.

4. The method according to claim 2, wherein said flagging of said demand statements provides different priorities of flags to different demand statements.

5. A method of planning the supply of components needed to manufacture products comprising:

providing demand statements, wherein each of said demand statements indicates a quantity of a product desired;

flagging at least one of said demand statements;

determining, on a computer processor, a volume of said components needed comprising:

performing an implosion of a highest priority flagged demand statement, wherein said implosion is performed without constraints for flagged demand statements;

performing an explosion of said highest priority flagged demand statements;

comparing results of said implosion with results of said explosion for said flagged demand statements to generate risk indicators for said flagged demand statements;

repeating said implosion operation, said explosion operation and said determining said difference on said next highest priority flagged demand statement until there are no more unprocessed flagged demand statements;

identifying components based on said risk indicators that need to be chased and a priority order of chasing said identified components; and showing said identified components that need to be chased and a priority order of chasing said identified components, wherein said implosion is performed with constraints for non-flagged demand statements.

6. The method according to claim 5, wherein said determining process produces risk indicators for said flagged demand statements, wherein said risk indicators provide a quantity of needed components that are unavailable.

7. The method according to claim 5, wherein said flagging of said demand statements provides different priorities of flags to different demand statements.

8. A system for planning the supply of components needed to manufacture products comprising:

demand statements, wherein each of said demand statements indicate a quantity of a product desired;

flags associated with ones of said demand statements; and a processor that processes an implosion of a highest priority flagged demand statement determines a volume of said components needed, and is performed without constraints for flagged demand statements, wherein said said processor performs an explosion on said highest priority flagged demand statement and determining a difference between said implosion and said explosion by comparing results of said implosion with results of said explosion, wherein said difference between said implosion and said explosion produces a risk indicator, and wherein said implosion operation, said explosion operation and said determining said difference on said next highest priority flagged demand statement until there are no more unprocessed flagged demand statements;

wherein when said risk indicator is greater than an available quantity, said risk indicator identifies components that need to be chased and a priority order of chasing said identified components, wherein said implosion is performed with constraints for non-flagged demand statements.

9. The system according to claim 8, wherein said implosion produces risk indicators for said flagged demand statements, wherein said risk indicators provide a quantity of needed components that are unavailable.

10. The system according to claim 8, wherein said flags have different priorities.

11. A program storage device readable by machine, tangibly embodying a program of instruction executable by said machine to perform a method of planning the supply of components needed to manufacture products, said method comprising:

providing demand statements, wherein each of said demand statements indicate a quantity of a product desired;

flagging ones of said demand statements; and determining a volume of said components needed based on an implosion of a highest priority flagged demand statement, wherein said implosion is performed without constraints for flagged demand statements;

performing an explosion on said highest priority flagged demand statement;

determining a difference between said implosion and said explosion by comparing results of said implosion with results of said explosion, wherein said difference between said implosion and said explosion produces a risk indicator;

repeating said implosion operation, said explosion operation and said determining said difference on said next highest priority flagged demand statement until there are no more unprocessed flagged demand statement;

wherein when said risk indicator is greater than an available quantity, said risk indicator identifies identifying components that need to be chased and a priority order of chasing said identified components when said risk indicator is greater than an available quantity; and showing said identified components that need to be chased and a priority order of chasing said identified components, wherein said implosion is performed with constraints for non-flagged demand statements.

12. The program storage device according to claim 11, wherein said determining process produces risk indicators for said flagged demand statements, wherein said risk indicators provide a quantity of needed components that are unavailable.

13. The program storage device according to claim 11, wherein said flagging of said demand statements provides different priorities of flags to different demand statements.

* * * * *